United States Patent
Glime, III et al.

(10) Patent No.: US 9,810,328 B2
(45) Date of Patent: Nov. 7, 2017

(54) VALVE AND VALVE WITH SEAT INSERTION TOOL AND EXTRACTION TOOL

(71) Applicant: Swagelok Company, Solon, OH (US)

(72) Inventors: William H. Glime, III, Chagrin Falls, OH (US); Mark A. Clason, Orwell, OH (US); Jeffrey Nathan Overton, Twinsburg, OH (US)

(73) Assignee: Swagelok Company, Solon, OH (US)

( * ) Notice: Subject to any disclaimer, the term of this patent is extended or adjusted under 35 U.S.C. 154(b) by 132 days.

(21) Appl. No.: 14/706,198

(22) Filed: May 7, 2015

(65) Prior Publication Data

US 2015/0323082 A1 Nov. 12, 2015

Related U.S. Application Data

(60) Provisional application No. 61/991,816, filed on May 12, 2014, provisional application No. 62/055,793, filed on Sep. 26, 2014.

(51) Int. Cl.
*F16K 43/00* (2006.01)
*F16K 7/16* (2006.01)
*F16K 1/42* (2006.01)

(52) U.S. Cl.
CPC ............... *F16K 7/16* (2013.01); *F16K 1/422* (2013.01); *F16K 1/425* (2013.01); *Y10T 137/0491* (2015.04); *Y10T 137/6065* (2015.04); *Y10T 137/6109* (2015.04)

(58) Field of Classification Search
CPC . F16K 1/42; F16K 1/422; F16K 1/427; F16K 7/16; Y10T 137/6154
USPC ....... 137/327, 329.01, 329.04; 251/357, 360, 251/361, 362, 363; 29/221.6
See application file for complete search history.

(56) References Cited

U.S. PATENT DOCUMENTS

| | | | |
|---|---|---|---|
| 1,039,391 A | 9/1912 | Hazelip | |
| 2,271,137 A | 1/1942 | Hamer | |
| 2,716,421 A | 8/1955 | Bertrand | |
| 3,029,501 A * | 4/1962 | Leathers | B25B 27/026 254/93 R |
| 3,844,532 A | 10/1974 | Buck | |
| 4,520,842 A | 6/1985 | Elliott | |
| 4,716,924 A * | 1/1988 | Pacht | F04B 49/10 137/327 |

(Continued)

FOREIGN PATENT DOCUMENTS

| | | |
|---|---|---|
| DE | 3300033 | 8/1984 |
| DE | 3447358 | 3/1986 |

(Continued)

OTHER PUBLICATIONS

Springless Diaphragm Valves for High Performance, DP Series brochure, Swagelok Company, 8 pgs., Apr. 2014.

(Continued)

*Primary Examiner* — Reinaldo Sanchez-Medina
(74) *Attorney, Agent, or Firm* — Calfee, Halter & Griswold LLP

(57) ABSTRACT

A valve and tool assembly includes a valve seat, a valve seat recess, a seat carrier and a valve seat displacement tool. A valve seat installation tool is also described, as well as a valve seat replacement kit and a method for replacing a valve seat. The valve may be a diaphragm valve, for example.

14 Claims, 15 Drawing Sheets

(56) References Cited

U.S. PATENT DOCUMENTS

| | | | |
|---|---|---|---|
| 4,982,483 A | 1/1991 | Roush | |
| 5,474,124 A * | 12/1995 | Samuels | E21B 31/20 |
| | | | 166/237 |
| 5,529,087 A | 6/1996 | Berry et al. | |
| 5,533,245 A | 7/1996 | Stanton | |
| 5,787,561 A | 8/1998 | Harmand | |
| 5,975,104 A | 11/1999 | Wilkins | |
| 6,189,862 B1 | 2/2001 | McKay | |
| 6,227,225 B1 | 5/2001 | Domingue | |
| 6,378,550 B1 | 4/2002 | Herndon et al. | |
| 6,415,487 B1 | 7/2002 | Leimer | |
| 6,571,819 B1 | 6/2003 | Capoferi | |
| 6,644,339 B2 | 11/2003 | Gorges et al. | |
| 6,698,449 B2 | 3/2004 | Hall et al. | |
| 6,889,702 B2 | 5/2005 | Hall et al. | |
| 6,929,024 B1 | 8/2005 | Rucker | |
| 6,973,939 B2 | 12/2005 | Gorges et al. | |
| 7,686,280 B2 * | 3/2010 | Lowery | F16K 7/14 |
| | | | 251/331 |
| 2007/0145321 A1 * | 6/2007 | Lowery | F16K 7/14 |
| | | | 251/331 |
| 2011/0173814 A1 | 7/2011 | Patel | |
| 2013/0098473 A1 | 4/2013 | Wassil, Jr. | |

FOREIGN PATENT DOCUMENTS

| | | |
|---|---|---|
| DE | 19516648 | 11/1996 |
| DE | 19601853 | 4/1997 |
| EP | 409373 | 3/1990 |
| GB | 2091151 | 7/1982 |
| GB | 2153452 | 8/1985 |
| JP | 9-195734 | 7/1997 |

OTHER PUBLICATIONS

High-Flow, Springless Diaphragm Valves, DF Series brochure, Swagelok Company, 4 pgs., copyright 1997-2014.
International Search Report and Written Opinion from PCT/US15/29616 dated Aug. 7, 2015.

* cited by examiner

VALVE AND VALVE WITH SEAT INSERTION TOOL AND EXTRACTION TOOL

RELATED APPLICATIONS

The present application claims the benefit of U.S. Provisional patent application Ser. No. 62/055,793 filed on Sep. 26, 2014 for VALVE WITH REPLACEABLE SEAT AND EXTRACTION TOOL; and U.S. Provisional patent application Ser. No. 61/991,816 filed on May 12, 2014 for VALVE WITH REPLACEABLE SEAT AND TOOL THEREFOR; the entire disclosures of which are fully incorporated herein by reference.

TECHNICAL FIELD OF THE INVENTIONS

The inventions relate to fluid flow and delivery devices and methods, and more particularly to valves used to control fluid flow and delivery. The inventions further relate to a tool with the valve.

BACKGROUND OF THE INVENTIONS

Valves are well known for use as flow control devices for gas and liquid fluid delivery. In the semiconductor industry as well as others, delivery of process chemicals during various processing operations is controlled using valves, for example, high purity valves. Some of the more common applications for valves are chemical vapor deposition (CVD) and atomic layer deposition (ALD).

SUMMARY OF THE INVENTIONS

A first inventive concept presented herein provides a valve and a tool for installing a valve seat into the valve. In an embodiment, the valve and tool comprise a valve seat, a valve seat recess, a seat carrier and a valve seat displacement tool. Additional embodiments of this concept are presented herein.

A second inventive concept presented herein provides a valve seat replacement kit. In an embodiment, the valve seat replacement kit comprises a valve seat extraction tool for removing an installed valve seat from a valve seat recess in a valve body, and a valve seat installation tool for installing a valve seat into the valve seat recess to replace the valve seat that was removed. Additional embodiments of this concept are presented herein.

A third inventive concept presented herein provides a valve seat installation tool. In an embodiment, the valve seat installation tool comprises a seat carrier, a retainer nut and a valve seat displacement tool, with the retainer nut being operable to join the valve seat displacement tool and the valve seat carrier to a valve body. Additional embodiments of this concept are presented herein.

A fourth inventive concept presented herein provides a valve seat extraction tool for removing a valve seat from a valve body. In an embodiment, the valve seat extraction tool comprises a threaded portion, and an alignment member that mounts to the valve body to align axially the extraction tool with a valve seat. Additional embodiments are presented herein.

A fifth inventive concept presented herein provides a method for replacing a valve seat that was previously installed in a valve seat recess of a valve. In an embodiment the method comprises the steps of removing the previously installed valve seat, compressing a replacement valve seat, holding the compressed valve seat in a first position that is axially spaced from the valve seat recess, and displacing the compressed replacement valve seat from the first position into the valve seat recess. Additional embodiments of this concept are presented herein.

Another inventive concept presented herein provides a valve seat extraction tool assembly for removing a valve seat from a valve body. In an embodiment, the valve seat extraction tool assembly comprises a valve seat extraction tool having a threaded portion, and an eccentric alignment member that mounts to the valve body to align the valve seat extraction tool with a valve seat. The eccentric alignment member has an alignment axis that is parallel to and radially offset from a centerline of the valve seat. Additional embodiments are presented herein.

Another inventive concept presented herein provides a valve seat extraction tool for removing a valve seat from a valve body. In an embodiment, the valve seat extraction tool comprises a threaded portion, an alignment member that mounts to the valve body to align the extraction tool with a valve seat, and an eccentric bushing that is at least partially received in the alignment member. The eccentric bushing has a longitudinal axis that is parallel to and radially offset from a centerline of the valve seat. Additional embodiments are presented herein.

The eccentric alignment member and/or the eccentric bushing concepts may be used as alternative embodiments for the first through fourth embodiments described above as well as alternative embodiments thereof.

Another inventive concept presented herein provides a method for removing a valve seat that was previously installed in a valve seat recess of a valve. In an embodiment, the method includes the steps of using an eccentric extraction tool comprising a threaded portion to grip a portion of the valve seat, and then withdrawing the valve seat from the valve seat recess. Additional embodiments are disclosed herein.

These and other inventive concepts are fully disclosed hereinbelow, and will be readily understood by those skilled in the art from the following detailed description of the exemplary embodiments in view of the accompanying drawings.

DESCRIPTION OF EXEMPLARY EMBODIMENTS

Figure 1:
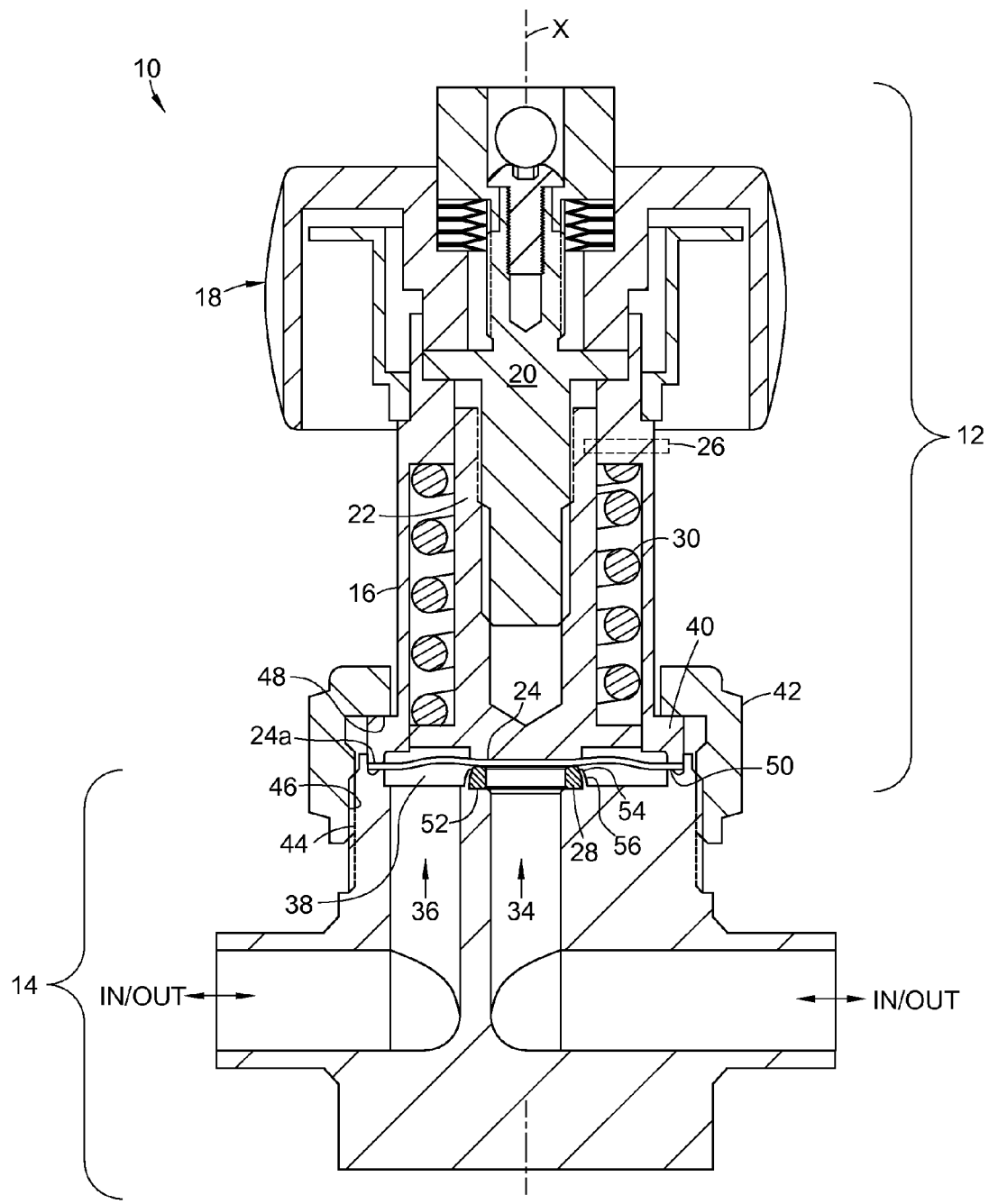
FIG. 1 illustrates an embodiment of a prior art valve that may be used with the tools disclosed herein.
Figure 3:
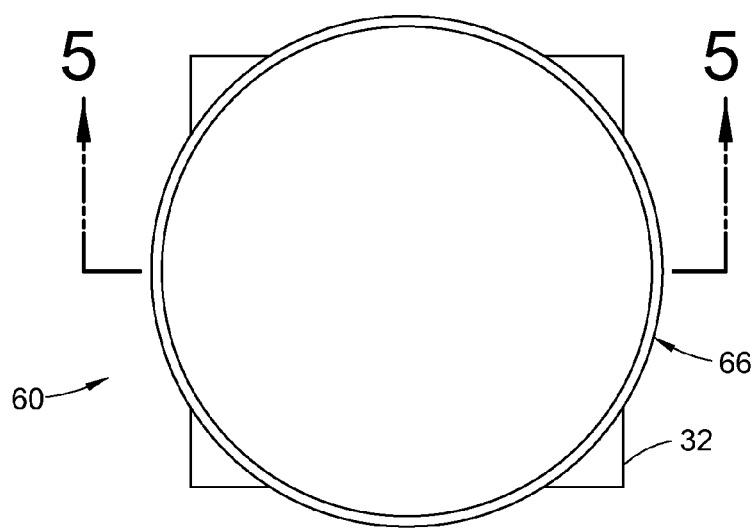
FIG. 3 is a top plan view of the assembly of FIG. 2.
Figure 2:
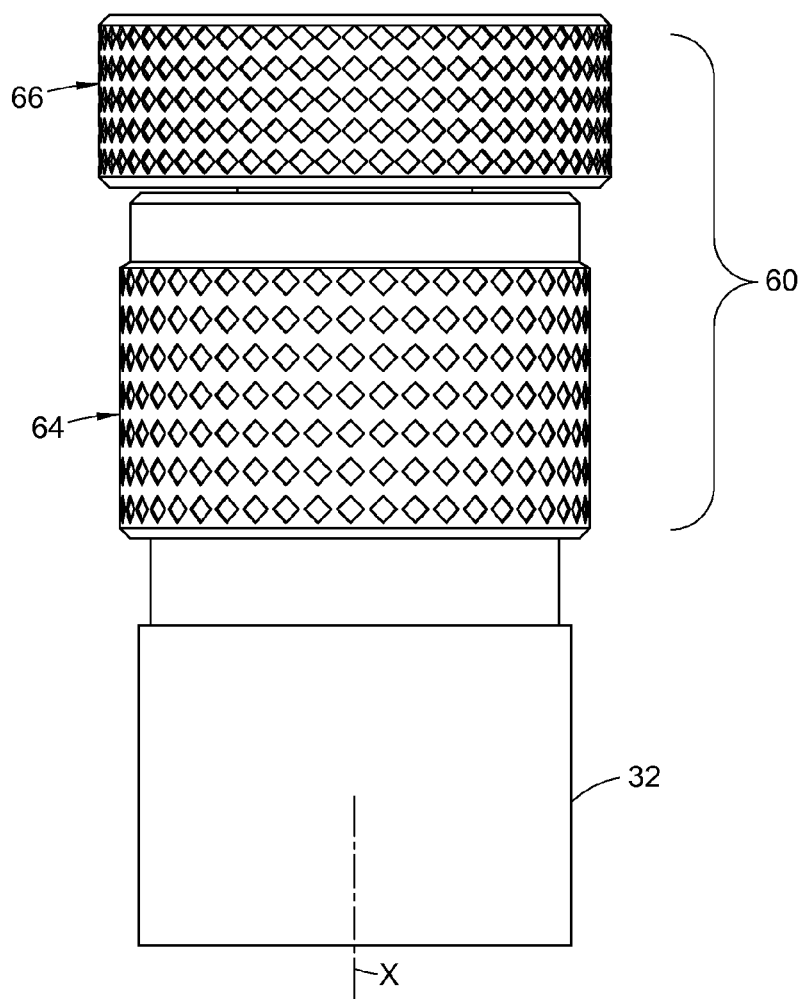
FIG. 2 is an elevation view of an assembly of a valve seat installation tool installed on a valve body.
Figure 4:
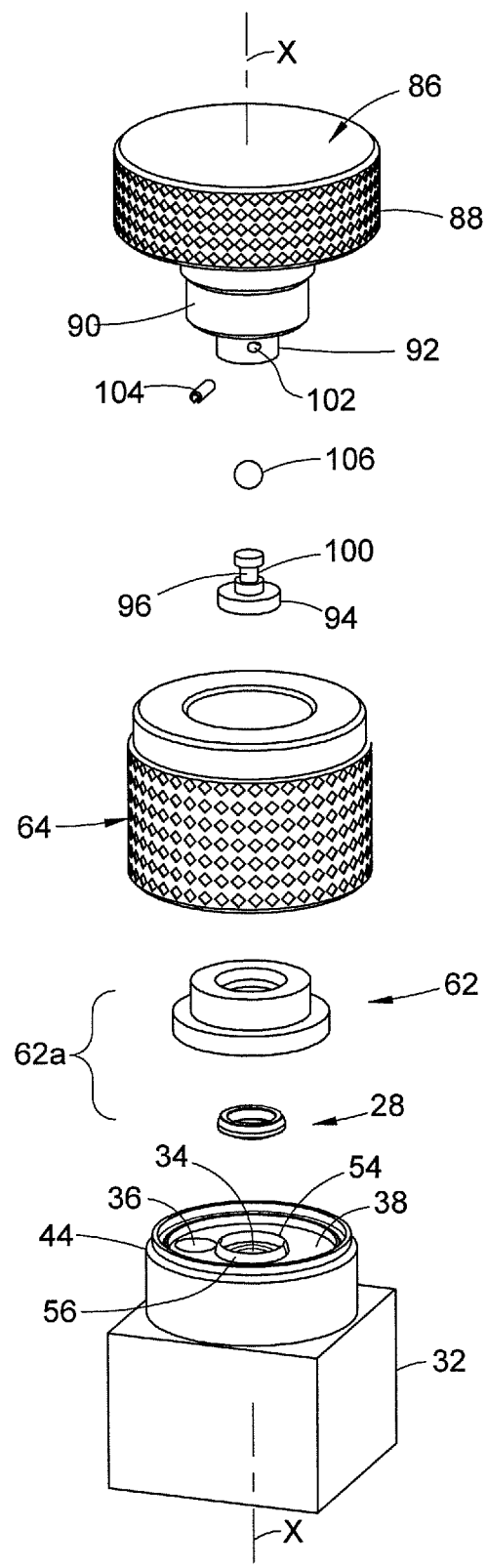
FIG. 4 is an exploded perspective view of the assembly of FIG. 2.

With reference to FIG. 1, in an exemplary embodiment, a valve and actuator assembly 10 may include an actuator assembly 12 and a valve assembly 14. The actuator assembly 12 may be stacked on top of the valve assembly 14 or otherwise operably coupled therewith to open and close the valve. Although this exemplary embodiment illustrates use of a manual actuator, alternative embodiments may use automatic actuators, for example a pneumatic actuator. The valve assembly 14 may be used to control flow of a fluid such as liquid or gas.

The actuator assembly 12 and the valve assembly 14 may be but need not be conveniently realized as a DP Series or a DF Series diaphragm valve, which are available commercially from Swagelok Company, Solon, Ohio. The DP Series and DF Series valves are also shown in the product catalogs titled SPRINGLESS DIAPHRAGM VALVES and HIGH FLOW SPRINGLESS DIAPHRAGM VALVES which are publicly available online and otherwise from Swagelok Company, and are fully incorporated herein by reference. However, many other actuator designs and valve designs may alternatively be used. The inventions are also not limited to use with a springless diaphragm valve assembly, but may alternatively be used with many other valve designs, including but not limited to a tied diaphragm valve or a valve having a stem sealed by o-rings or packings such as may be used in conventional needle or plug valves and so on.

The actuator assembly 12 for convenience may be an actuator assembly that is sold commercially with the DP Series or DF Series diaphragm valves. Therefore, a detailed explanation of the actuator assembly 12 is not necessary to understand and practice the present inventions. The configuration in the drawings is for a normally closed valve and manual actuator assembly, but alternatively the valve and actuator assembly 10 may be practiced with a normally open configuration and/or with an automatic actuator.

The actuator assembly 12 includes bonnet 16 and a handle 18 that is supported on the bonnet 16 and can be rotated relative thereto. The handle 18 may be turned manually to open and close the valve assembly 14. The handle 18 is operably coupled to a drive member 20 so that rotation of the handle causes rotation of the drive member 20. The drive member 20 is threadably coupled to a valve stem 22. The valve stem contacts a non-wetted side of a diaphragm 24. A set screw 26 restricts the valve stem 22 from turning with the actuator stem 20. As a result, rotation of the actuator stem 20 causes axial displacement of the valve stem 22 up and down depending on the direction that the handle 18 is rotated. The valve 14 is shown in FIG. 1 in a closed position and is a normally closed valve. In order to close the valve 14, the handle 18 is turned clockwise as viewed in the drawing which causes the actuator stem 20 to rotate clockwise which in turn causes the valve stem 22 to translate axially downward so as to press the diaphragm 24 against a valve seat 28. A spring 30 is provided and applies a closing force to the valve stem 22. This limits the closing force applied to the diaphragm to thereby prevent over-tightening of the handle 18 from damaging the valve seat 28. In order to open the valve 14, the handle 18 is turned counterclockwise as viewed in the drawing. This causes the actuator stem 20 to turn counterclockwise which causes the valve stem 22 to translate axially upward which allows the diaphragm 24 to return to its natural domed shape with a concave surface separated from the valve seat 28 thereby opening the valve 14 to flow. The diaphragm 24 may be domed to have a spring-like effect in that the natural unstressed state of the diaphragm 24 is to return to its dome concave shape.

The valve assembly 14 includes a valve body 32 and may have two or more ports for fluid flow through the valve body. The valve body 32 has a longitudinal axis X that is coaxial with a centerline of the valve seat 28. In the exemplary embodiments, the valve seat 28 maybe but need not be symmetrical about the centerline of the valve seat 28 and hence the axis X. The axis X may be but need not be a central longitudinal axis of the valve body 32. All references herein to axial and radial alignment or directions are referenced to the axis X unless otherwise noted herein.

The valve body 32 may include a first or inlet port 34 and a second or outlet port 36 both of which are in fluid communication with a valve cavity 38 when the valve is open. The valve cavity 38 is sealed by the diaphragm 24. When the diaphragm 24 is pressed against the valve seat 28 flow is prevented between the inlet port 34 and the outlet port 36. When the diaphragm 24 is out of contact with the valve seat 28 the inlet port 34 and the outlet port 36 are in fluid communication with each other through the valve cavity 38. Additional ports may be provided as needed. Fluid flow may be in either direction between the first port 34 and the second port 36.

A distal end of the bonnet opposite the handle 18 end includes a flange 40. A bonnet nut 42 may be used to clamp and hold the bonnet 16 on the valve body 32. For example, the valve body 32 may include a threaded portion 44 that mates with a threaded portion 46 of the bonnet nut 42. The bonnet nut 42 also includes a flange 48 that engages the flange 40 of the bonnet so that when the bonnet nut 42 is tightened down onto the valve body the bonnet flange 40 is captured and axially loaded between the bonnet nut flange 48 and a clamping surface 50 of the valve body 32. An outer peripheral portion 24a of the diaphragm 24 may be clamped between the bonnet flange 40 and the clamping surface 50 of the valve body 32. This provides a body seal that seals the valve cavity 38 against fluid loss to the ambient environment.

The valve seat 28 may be disposed in a valve seat recess 52 of the valve body 32. The valve seat recess 52 surrounds the inlet port 34 and may include an annular support wall 54 that delimits the valve seat recess 52. The annular support wall 54 may be inwardly and optionally staked as shown so as to capture and secure the valve seat 28 in the valve seat recess 52. Thus, the support wall 54 when staked may present a tapered frusto-conical outer surface 56.

The valve assembly 14 may be made of many different materials. The DP Series and DF Series include valve bodies and diaphragms made of stainless steel. The valve seat 28 is commonly made of non-metal materials, for example, including but not limited to PFA (perfluoalkoxy), PTFE (polytetrafluoroethylene), PCTFE (polychlorotrifluoroethylene), PEEK (polyetheretherkeytone), PI (polyimide), and elastomers. It is preferred but not required in all applications that the valve seat material be elastically compressible.

The valve seat 28 is a wear item in the valve assembly 14. Field and in-service replacement of the valve seat 28 is usually not performed because it can be difficult to remove the valve seat 28 from the staked valve seat recess 52. In order to remove the valve seat 28 in a fully assembled valve and actuator assembly 10, the bonnet nut 42 is loosened and unthreaded from the valve body which allows the actuator 12 to be removed and placed aside. This provides access to the diaphragm 24 which is then removed. After the diaphragm 24 is removed an operator has access to the valve seat 28. Our experience has shown that the valve seat 28 can be difficult to remove without damaging exposed surfaces of the valve body 32 such as the valve cavity 38 and the valve ports 34, 36. And even if the valve seat 28 is successfully extracted, a replacement valve seat can be difficult to install into the staked valve seat recess 52 without excessive handling of the valve seat which is undesirable as well as the possibility of damaging exposed surfaces of the valve body 32.

We provide in accordance with the teachings and inventions herein, valve seat displacement tools which may include a valve seat extraction tool 58 and a valve seat installation tool 60. The valve seat extraction tool 58 (also referred to herein as the extraction tool 58 for short) allows an installed valve seat 28 to be removed in a safe manner without damage to the valve body surfaces. The valve seat installation tool 60 allows a valve seat 28 to be installed into the valve seat recess 52 (whether the valve seat recess is staked or otherwise) without having to handle the valve seat 28 and without exposing surfaces of the valve body 32 to damage. Although the exemplary embodiments herein illustrate a threaded connection between the installation tool 60 and the extraction tool 58 with the valve body 32, such is for convenience. Non-threaded embodiments may alternatively be used that do not utilize a threaded connection between the installation tool 60 or the extraction tool 58 with the valve body 32. By valve seat displacement tool we mean a tool that is configured to contact and displace or move the valve seat 28 axially with respect to the valve seat recess 52, either as a valve seat installation tool or a valve seat extraction tool.

With reference to FIGS. 2-5 and 7, in an embodiment, a valve seat displacement tool may be realized in the form of a valve seat installation tool 60 (also referred to herein as the installation tool 60 for short) that may be easily assembled on a valve body 32. The exemplary embodiments herein show a valve seat installation tool 60 that can be mounted on a valve body such as a DP Series or DF Series noted above. However, the inventions may be utilized with many different valve bodies with appropriate modifications if needed for thread type, valve body geometry and so on.

The valve seat installation tool 60 (see FIG. 4) includes a valve seat carrier 62 that holds a valve seat 28 that is to be installed into the valve body 32, and in particular the valve seat recess 52 of the valve body. The installation tool 60 further includes a retainer nut 64 and a valve seat displacement tool 66.

Figure 7:
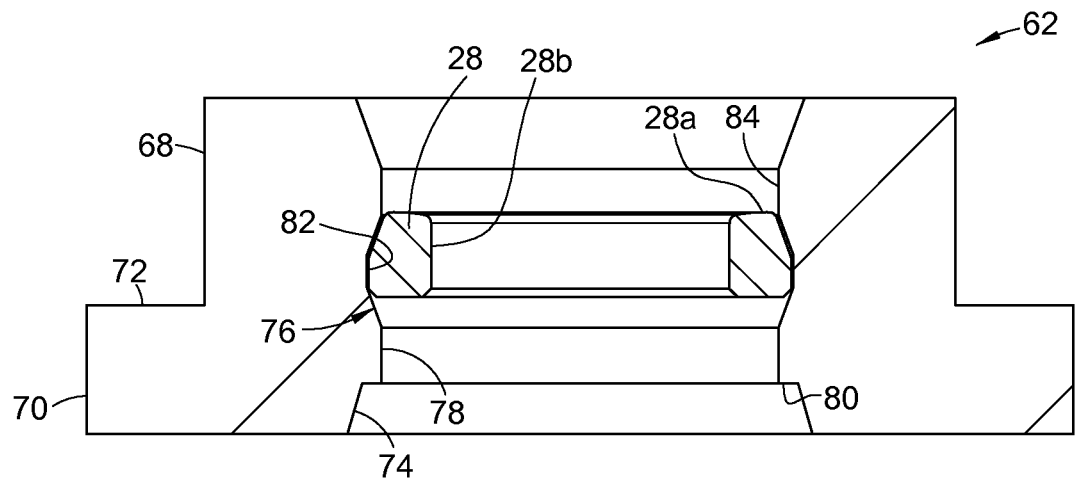
FIG. 7 is a cross-section of a valve seat carrier as shown in FIGS. 5 and 5A.

With reference to FIG. 7, the seat carrier 62 is a generally annular carrier body 68 and may have a lower flange 70 with an upwardly facing radial surface or shoulder 72. The carrier body 68 also may include a frusto-conical surface 74 that may preferably be complementary shaped to the frusto-conical surface 56 of the annular support wall 54 in the valve body (FIG. 1.) The frusto-conical surface 74 of the carrier body 68 may be formed at one end of a through bore wall 76 that extends through the carrier body 68. Axially adjacent the frusto-conical surface 74 is a first cylindrical portion 78. The first cylindrical portion 78 has a diameter that is slightly less than the minor diameter of the frusto-conical surface 74, so as to form a radial step 80. The width of the radial step 80 approximates the width of the support wall 54 in the valve body that defines the valve seat recess 52. Therefore, the diameter of the first cylindrical portion 78 preferably is no greater than and may be slightly less than the minor diameter of the support wall 54 in the valve body 32. In this way, there is a smooth wall transition between the first cylindrical portion 78 and the support wall 54 when the seat carrier body 68 is positioned on the valve body 32 (see FIGS. 5 and 5A.)

The seat carrier 62 in FIG. 7 is shown with a valve seat 28 installed therein and provides a seat carrier subassembly 62a that may be used as part of the installation tool 60. The bore wall 76 further may include a carrier recess 82 that smoothly transitions at one end thereof to the first cylindrical portion 78 and that holds the valve seat 28 in place in the seat carrier. The diameter of the carrier recess 82 may be dimensioned to be slightly less than the major diameter of the valve seat 28 so that the valve seat 28 is compressed when positioned in the carrier recess 82. This compression can help hold the valve seat 28 inside the seat carrier 62 during shipment and normal handling. The diameter of the first cylindrical portion 78 is preferably less than the diameter of the carrier recess 82 so that as the valve seat 28 is pushed downward (as viewed in FIG. 7 and FIGS. 5 and 5A) the valve seat 28 is further compressed as will be further described hereinbelow. The carrier recess 82 smoothly transitions at a second end thereof to a second cylindrical portion 84 that may have the same diameter as the first cylindrical portion 78. Because the first cylindrical portion 78 and the second cylindrical portion 84 have a smaller diameter than the major diameter of the valve seat 28, as an alternative embodiment the carrier recess 82 may snugly or even loosely hold the valve seat 28, because the first and second cylindrical portions 78, 84 will help retain the valve seat inside the seat carrier 62. The seat carrier 62 also helps protect the valve seat 28 from damage during normal shipping and handling of the seat carrier subassembly 62a.

Figure 5:
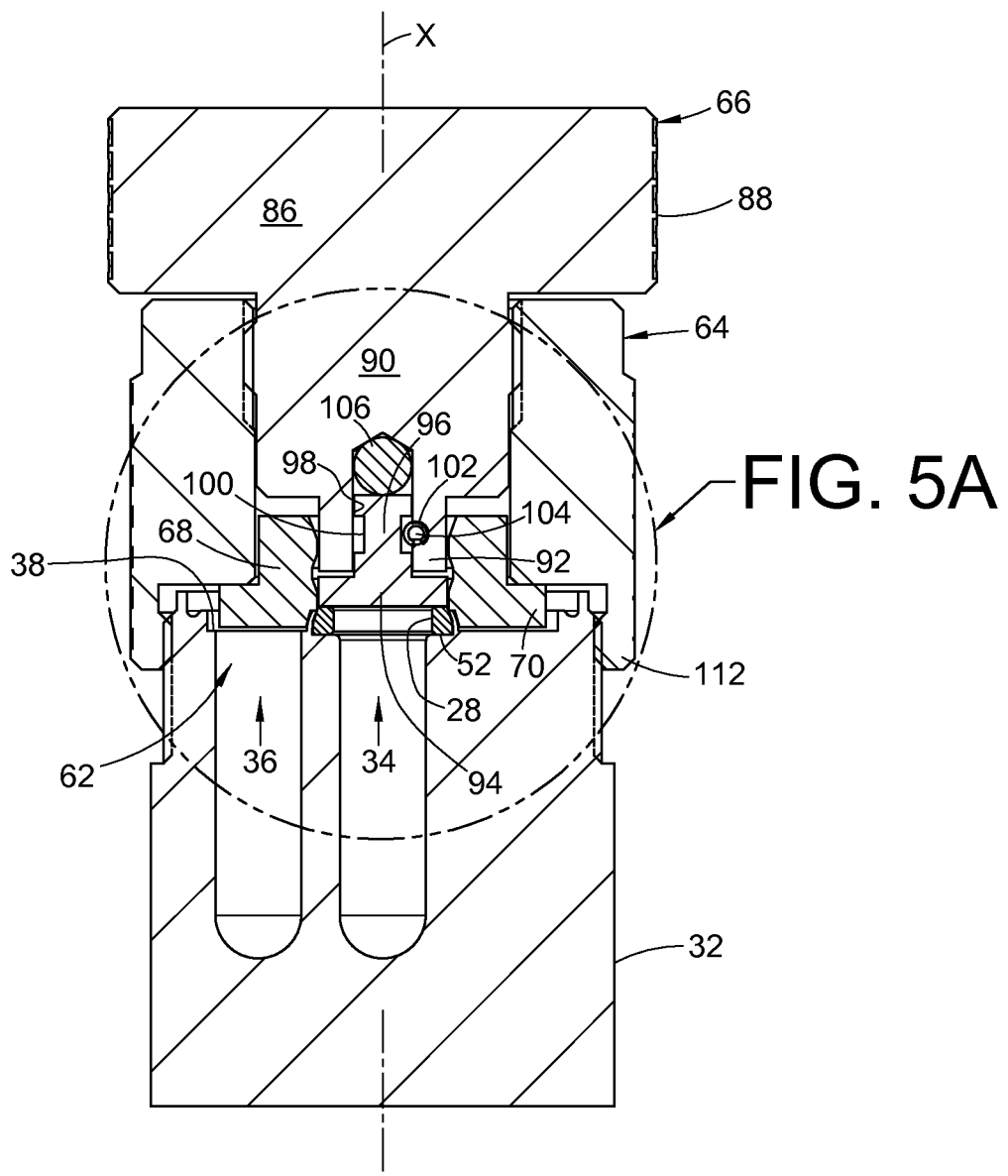
FIG. 5 is a longitudinal cross-section view of the assembly of FIG. 2 taken along the line 5-5 in FIG. 3.
Figure 5A:
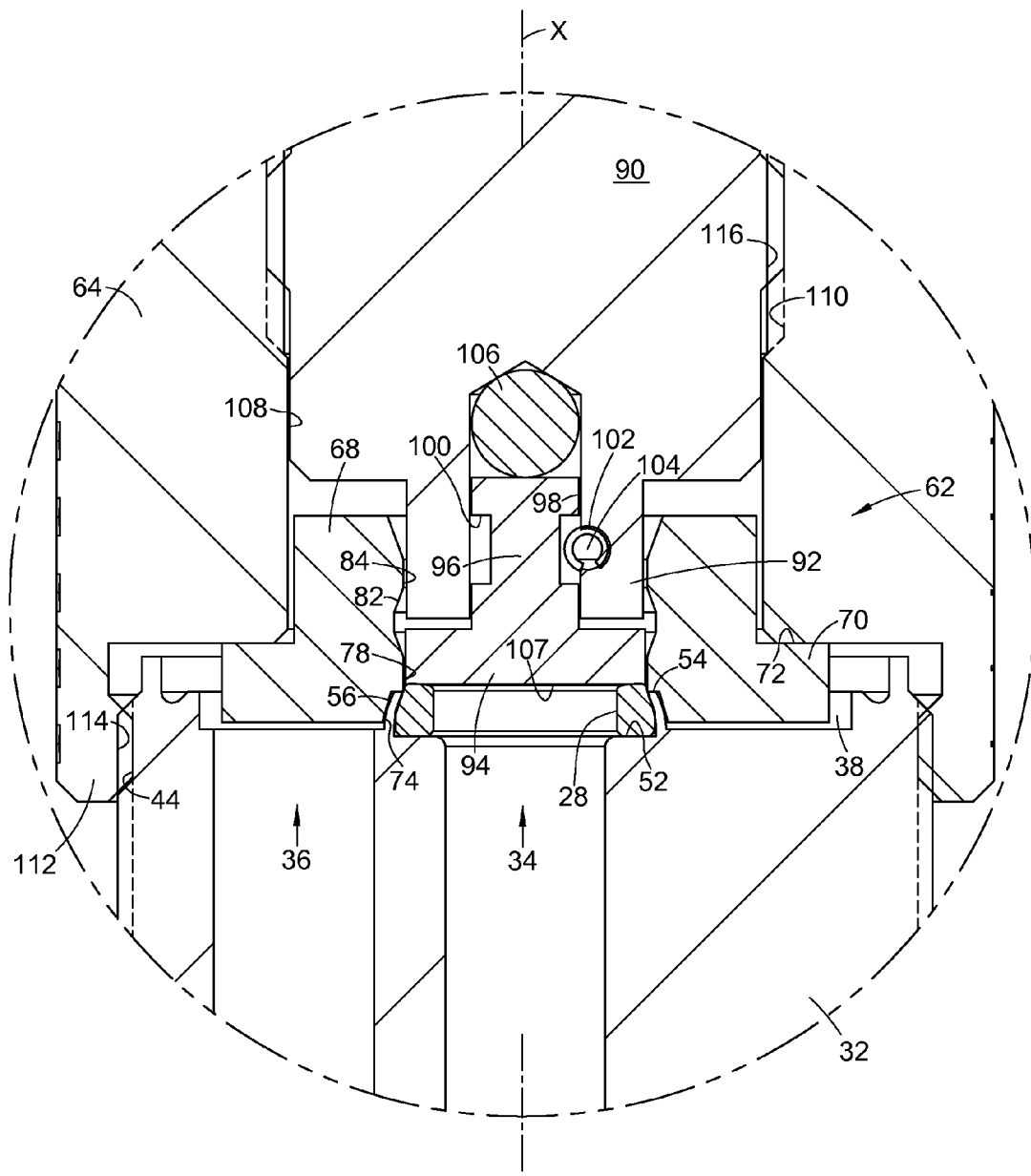
FIG. 5A is an enlarged view of the circled portion of FIG. 5.

Note that FIG. 7 shows the seat carrier 62 with the valve seat 28 positioned and held therein (in the carrier recess 82) as would be the case, for example, for shipping and normal handling prior to use. This position of the valve seat 28 is also the initial position for installing the valve seat 28 into the valve seat recess 52 when the installation tool 60 is mounted on the valve body 32. FIGS. 5 and 5A show the valve seat 28 after having been displaced axially into the valve seat recess 52 from the position that is shown in FIG. 7.

With reference to FIG. 5A, the valve seat installation tool 60 includes a valve seat displacement tool 66. FIG. 5A shows the valve seat installation tool 60, which may include the seat carrier 62, the retainer nut 64 and the valve seat displacement tool 66, installed on the valve body 32 as a completed assembly preparatory to installing the valve seat 28 into the valve seat recess 52. The valve seat displacement tool 66 may be realized in the form of an arbor 86 that has a knob 88 and an extension 90. The arbor extension 90 includes a boss 92 that retains a tip 94 which are centrally located on the valve seat displacement tool 66 and align with the axis X. The tip 94 is retained by the boss 92 such that the tip 94 is rotationally fixed relative to the arbor 86 about the axis X. The tip 94 includes a tip stem 96 that is received in a bore 98 in the boss 92. The tip stem 96 may be retained in the bore 98 using a tip stem recess 100 that cooperates with a bore recess 102 and an anti-rotation retainer pin 104. Therefore, the tip 94 is connected with the arbor 86 by the retainer pin 104 but the tip 94 will not rotate about the axis X when the arbor 86 is turned. A thrust bearing 106 may be provided to allow the arbor 86 to be freely turned about the axis X without applying torque to the tip 94.

With reference also to FIG. 5A, the valve seat installation tool 60 includes the retainer nut 64. The retainer nut 64 may have a right circular cylinder internal bore 108 with a first threaded portion 110. The centerline of the retainer nut 64 preferably is coaxial with the axis X which is also the centerline of the valve seat 28. The retainer nut 64 also may have a skirt 112 with a second threaded portion 114. The threaded skirt 112 threadably mates with the valve body threaded portion 44 so that the retainer nut 64 can be joined to the valve body 32 as shown in FIG. 5. The arbor extension 90 also includes a threaded portion 116 that cooperates with the first threaded portion 110 of the retainer nut 64. The arbor 86 therefore can be screwed into the retainer nut 64.

Thus, when fully assembled as in FIG. 5 and FIG. 5A, the retainer nut 64 is threadably joined to the valve body 32; and the valve seat displacement tool 66 is threadably joined to the retainer nut 64. The retainer nut 64 therefore operates as an alignment member between the valve seat displacement tool 66 and the valve seat carrier 62. The valve seat carrier 62 is partially received in the valve seat cavity 38, with the seat carrier flange 70 compressively loaded between the valve body 32 and the retainer nut 64.

With reference next to FIGS. 5A and 7, the valve seat carrier 62 self aligns with the valve seat recess 52 along the axis X. This is effected by the frusto-conical surface 74 closely conforming to the frusto-conical surface 56 of the annular support wall 54.

With reference to FIGS. 5, 5A and 7, an exemplary operation of the valve seat installation tool 60 may be as follows. The installation tool 60 is installed onto the valve body 32 as noted above, with the seat carrier 62 installed and held by the retainer nut 64, and the valve seat displacement tool 66 joined to the retainer nut 64. The valve seat 28 is disposed in the seat carrier recess 82 as in FIG. 7 at the beginning of the installation process. The arbor 86 is turned and by operation of the threaded connection with the retainer nut 64 the arbor 86 will advance axially downward as viewed in the drawings. The tip 94 has a surface 107 that will make contact with the valve seat 28 and as the knob 88 is further turned the tip 94 will apply a downward force against the valve seat 28, which pushes and displaces the valve seat 28 out of the carrier recess 82 and into the valve seat recess 52 of the valve body 32. This is the position shown in FIGS. 5 and 5A. The arbor 86 may be axially dimensioned so that the knob 88 contacts the upper surface 64a of the retainer nut 64 as a positive stop when the valve seat 28 is fully inserted into the valve seat recess 52. The valve seat 28 is thus fully seated in the valve seat recess 52. The valve seat displacement tool 66 is then turned in a reverse direction to retract the arbor axially upward. The arbor 86 may be either removed from the retainer nut 64 altogether or may be backed out enough to allow the retainer nut 64 to be loosened and disengaged from the valve body threaded portion 44. After the retainer nut 64 is separated from the valve body threaded portion 44, the valve seat displacement tool 66 and the seat carrier 62 (the latter which no longer has a valve seat 28 therein) may be removed.

Note that the valve seat 28 is installable into the valve seat cavity 52 without any need for the operator to handle the valve seat 28. The valve seat 28 may be installed into the valve seat carrier 62 at the manufacturer or other controlled location. The seat carrier 62 thus holds the valve seat and may protect the valve seat 28 from damage and contamination during shipping and normal handling. The seat carrier 62 may optionally be color coded and/or include other identifying information or visual indicia that informs an observer of one or more properties of the valve seat 28 retained therein. For example, color coding or other indicia and information may indicate the seat size or material for example.

With reference to FIG. 5A again, as noted hereinabove, the diameter of the first cylindrical portion 78 of the seat carrier 62 is no greater than and preferably slightly less than the minor diameter of the valve seat recess 52, especially the diameter of the support wall 54 that may present an edge to the valve seat 28 as it is displaced into the valve seat recess 52. The diameter of the first cylindrical portion 78 preferably is less than the diameter of the valve seat 28 in an unstressed condition. Therefore, as the valve seat 28 is displaced out of the carrier recess 82 the valve seat 28 will be compressed to allow the valve seat 28 to be pushed into the valve seat recess 52 of the valve body 32 without damage.

In addition, the second cylindrical portion 84 may have a diameter that closely receives the boss 92. This aligns the valve seat displacement tool along the axis X so that the surface 107 of the tip 94 makes flat or flush contact with the valve seat 28. The non-rotating tip 94 prevents damage to the valve seat 28 that could be otherwise cause by rubbing or abrasion between the tip 94 and the valve seat 28.

Figure 6:
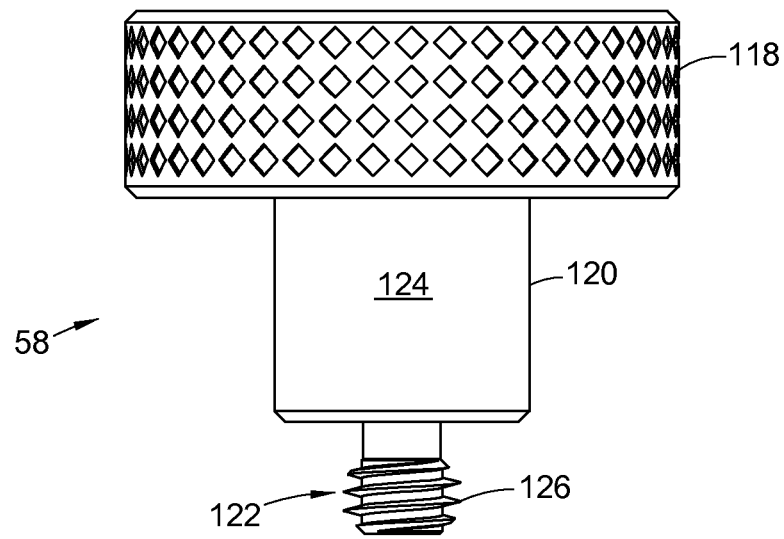
FIG. 6 is an elevation view of a valve seat extraction tool.
Figure 8:
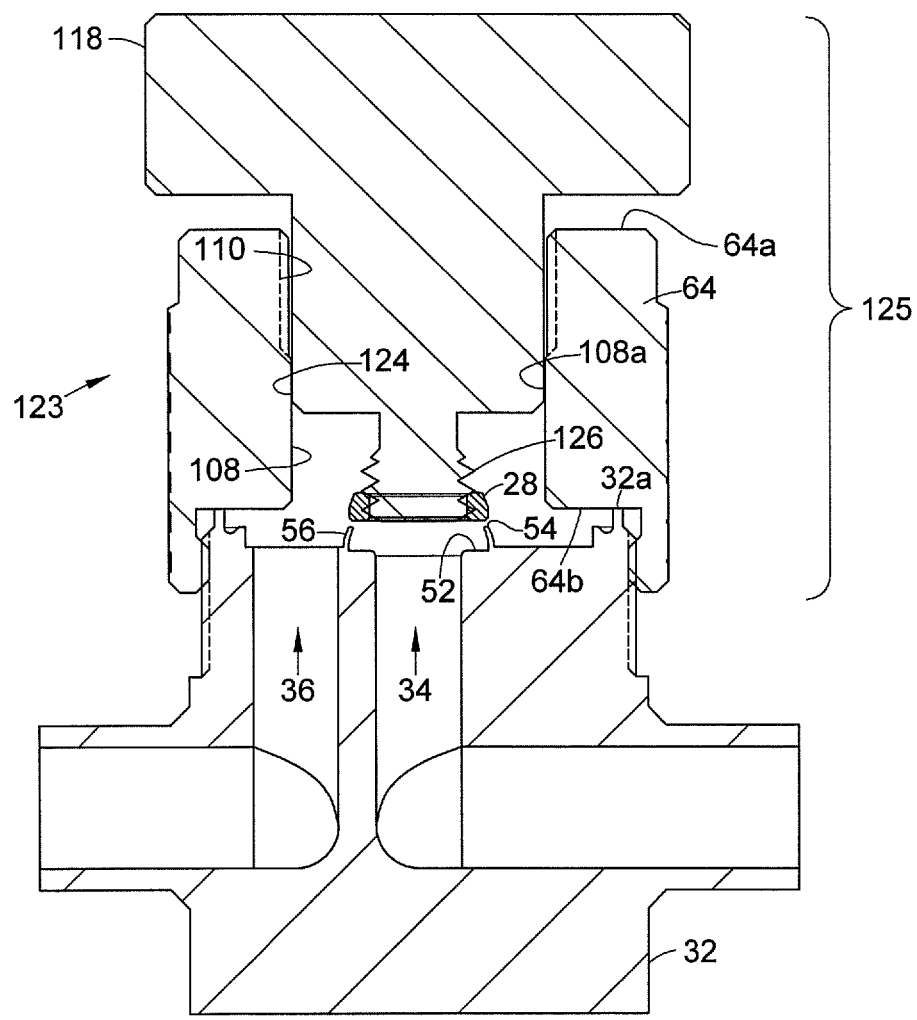
FIG. 8 is a longitudinal cross-section of the valve seat extraction tool in use and installed on a valve body, for example a valve body as shown in FIGS. 1 and 5.

With reference to FIGS. 6 and 8, in an embodiment, a valve seat displacement tool may also be realized in the form of the valve seat extraction tool 58, and may include a knob 118, a centrally positioned stem 120 and a threaded portion 122 which in an embodiment may be a threaded valve seat engaging portion or tip of the stem 120. The threaded portion 122 (hereafter we refer to the exemplary embodiment of a threaded tip 122) functions to grip or grab the valve seat 28 so as to be able to be used to extract the valve seat 28 from the valve seat recess 52. The extraction tool 58 may be axially aligned with the valve seat 28 using an alignment member 123 or other technique. For convenience the retainer nut 64 may be used as the alignment member 123 for this axial alignment. The extraction tool 58 with the alignment member 123 provide an embodiment of a valve seat extraction tool assembly 125 (FIG. 8.) As best shown in FIG. 8, the stem 120 may have a right circular cylinder shaped smooth wall 124 that is closely received and preferably journals in a corresponding right cylindrical smooth portion 108a of the retainer nut bore 108 without interference with the first threaded portion 110 of the retainer nut 64. In an embodiment, the alignment member 123 has a central longitudinal axis that is coaxial with the axis X, which also is the centerline of the valve seat 28. The threaded tip 122, therefore, is also aligned along the axis X because the threaded tip 122 is centrally located on the stem 120. The threads 126 of the threaded tip 122 are preferably sharp. In order to extract the valve seat 28 from the valve seat recess 52 after the actuator assembly 12 and the bonnet nut 42 have been removed, the diaphragm 24 (FIG. 1) is removed to provide access to the valve seat 28. The retainer nut 64 is installed onto the valve body 32 threaded portion 44 and tightened down. The retainer nut 64 may include a counterbore 64b that contacts an upper surface 32a of the valve body 32. The extraction tool 58 is slid axially into the retainer nut 64. The retainer nut 64 aligns the extraction tool 58 with the axis X so that the threaded tip 122 is aligned with the centerline of the valve seat 28. Initially, the knob 118 is axially spaced from the top surface 64a of the retainer nut 64 when the tip 122 initially contacts the valve seat 28. The threads 126 preferably have a major diameter that is greater than the inside diameter of the valve seat 28. As the sharply threaded tip 122 engages the valve seat 28, the threads 126 of the tip 122 self-tap a threaded connection with the valve seat 28. Preferably, the threads 126 self-tap about the entire inside diameter surface of the valve seat 28b (FIG. 7.) A small axially downward force may be applied to the knob 118 as the knob 118 is also turned. This will assist in the self-tapping between the threads 126 of the tip 122 and the valve seat 28. The knob 118 may be turned even after the knob 118 makes contact with the upper surface 64a of the retainer nut 64. Because there is friction between the valve seat 28 and the surfaces that delimit the valve seat recess 52, further rotation of the tip 122 causes the valve seat 28 to be pulled axially from the valve seat recess 52, somewhat analogous to removing a cork from a bottle by turning a corkscrew that is axially fixed. Note that FIG. 8 illustrates the valve seat 28 in a fully extracted position from the valve seat recess 52. After the valve seat 28 is displaced from the valve seat recess 52 the extraction tool 58 may be pulled out of the retainer nut 64, and the retainer nut 64 may be loosened and removed from the valve body 32. As an alternative, the knob 118 may be turned so as to have the threads 126 self-tap into the inside diametrical surface of the valve seat 28 to capture the valve seat. Then the retainer nut 64 may be loosened from the valve body 32 and the retainer nut 64 and the extraction tool 58 removed away from the valve body 32 with the valve seat 28 also removed therewith.

Figure 10:
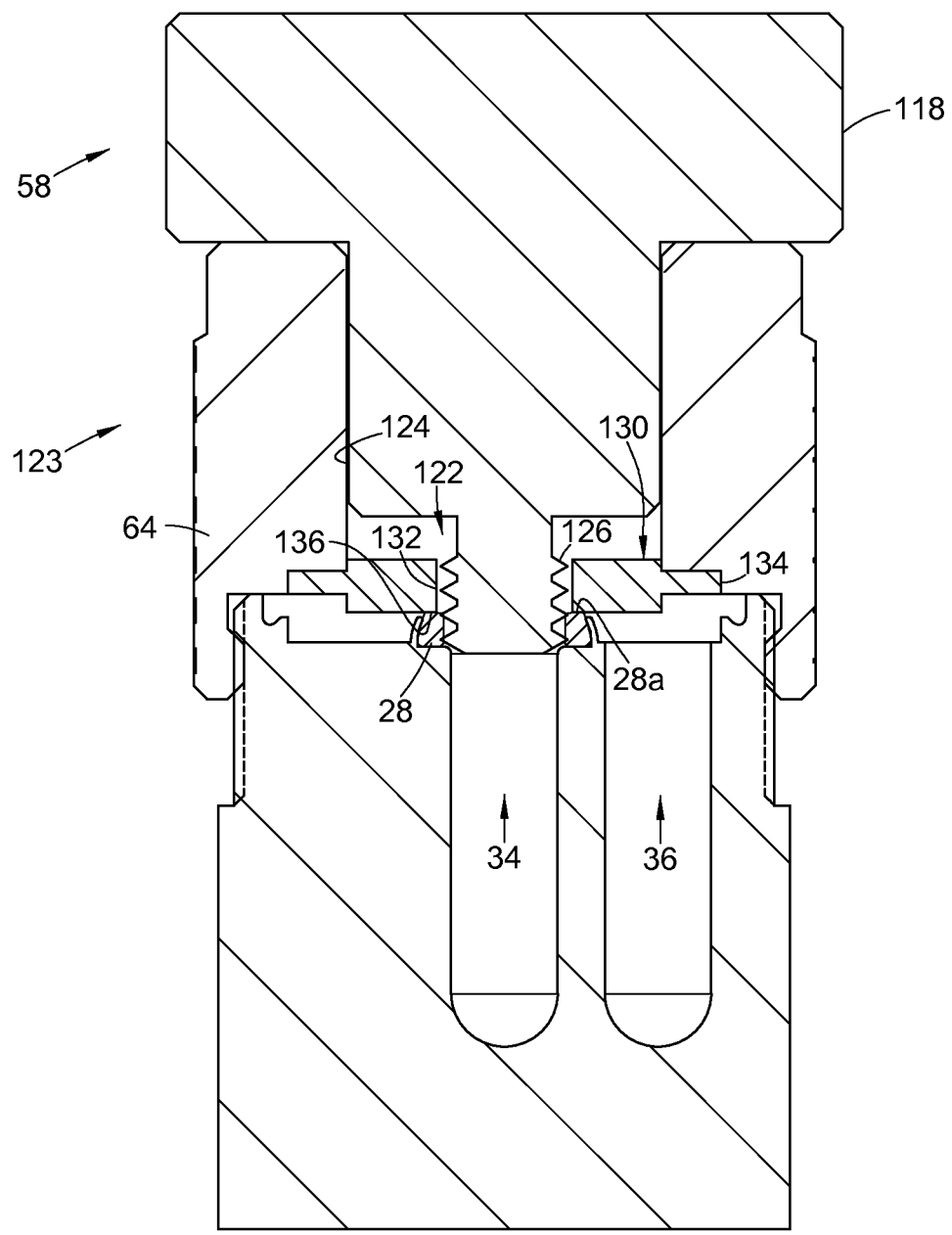
FIG. 10 is another embodiment in longitudinal cross-section of a valve seat extraction tool.

FIG. 10 illustrates an alternative embodiment for the extraction tool 58. In an embodiment, an anti-rotation disc 130 may be provided that may be held between the retainer nut 64 and the valve body 32. The anti-rotation disc 130 may be annular and include a central hole 132 that is large enough for the threaded tip 122 to pass through. The anti-rotation disc 130 may include a peripheral flange 134 that may contact a counterbore surface of the retainer nut 64. A portion of a lower surface 136 of the anti-rotation disc 130 contacts a facing surface 28a (FIG. 7) of the valve seat 28. Note that the valve seat 28 when fully seated in the valve seat recess 52 will axially extend above the annular support wall 54 which assures that the anti-rotation disc lower surface 136 contacts the valve seat 28. The portion of the lower surface 136 of the anti-rotation disc 130 that contacts the valve seat surface 28a may optionally may be roughened or textured, for example by knurling. For valve seats 28 that are made of hard material (for example a polyimide) the anti-rotation disc 130 prevents the valve seat 28 from rotating while the threaded tip 122 is self-tapping into the valve seat 28. The anti-rotation disc 130 may be used with other valve seats made from different materials even materials that are not hard. The anti-rotation disc 130 is but one way to prevent rotation of the valve seat 28 while the tip threads 126 are cutting into the valve seat 28 for extraction. Other techniques that can be used include but are not limited to providing a specialized retainer nut 64 that would make contact with the valve seat 28 or a spring loaded bushing as part of the extraction tool 58. Note that for the extraction tool 58, the retainer nut 64 may conveniently be the same as the retainer nut 64 used with the installation tool 60 but such does not have to be the case. A different alignment member 123 may be used for each tool 58, 60 as needed.

An exemplary operation of the embodiment of FIG. 10 is as follows. After the diaphragm 24 has been removed, the anti-rotation disc 130 may be positioned in the valve body 32 so as to contact the valve seat facing surface 28a. The retainer nut 64 is then tightened onto the valve body 32, which applies a compressive load between the anti-rotation disc 130 and the valve seat 28. Then the extraction tool 58 is slid axially into the retainer nut 64 until the tip 122 engages the valve seat 28. The retainer nut 64 aligns the extraction tool 58 with the axis X so that the threaded tip 122 is aligned with the center of the valve seat 28. The knob 118 is turned and the sharply threaded tip 122 self-taps a threaded connection with the valve seat 28. A small axially downward force may be applied to the knob 118 as the knob 118 is also turned. This will assist in the self-tapping between the tip 122 and the valve seat 28. The anti-rotation disc 130 prevents the valve seat 28 from turning as the threaded 126 cut into the inside diametrical surface of the valve seat. After the valve seat 28 is captured by the threads 126, the retainer nut 64 may be loosened from the valve body 32 and the retainer nut 64, the extraction tool 58 and the valve seat 28 are pulled away from the valve body 32 thereby removing the valve seat 28 from the valve seat recess 52.

Figure 9:
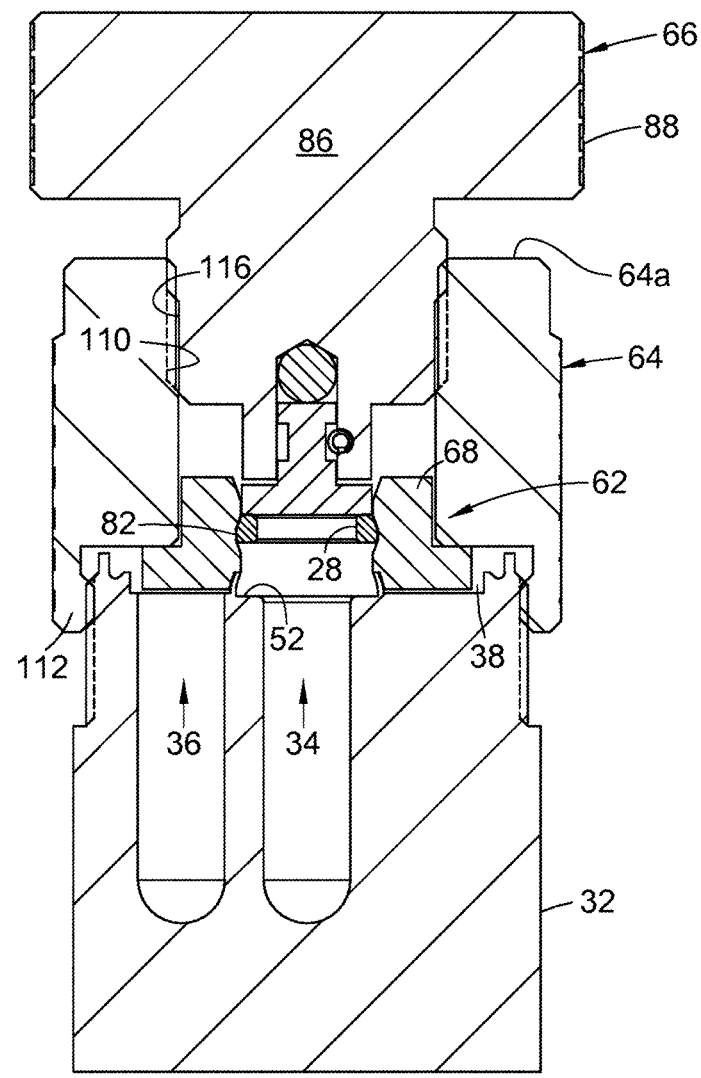
FIG. 9 is a longitudinal cross-section of the valve seat extraction tool in use after displacement of the valve seat from a valve seat recess.

We also provide a method for replacing a previously installed valve seat in a valve assembly having a longitudinal axis. In an embodiment, the method may include accessing a valve seat 28 that was previously positioned in a valve seat recess 52 in a valve body 32. Next the valve seat 28 is extracted as described above or otherwise. A replacement valve seat 28 is then installed into the valve seat recess 52 by compressing the replacement valve seat 28 and holding the compressed replacement valve seat 28 in a first position, for example in the carrier recess 82 of the seat carrier 62, that is axially spaced from the valve seat recess 52. The compressed replacement valve seat 28 is then axially displaced from the first position into the valve seat recess 52. FIG. 9 illustrates the valve seat 28 in the first position just as the valve seat displacement tool 66, and in particular the tip 94, contacts an upper surface of the valve seat 28. FIG. 5A shows the valve seat 28 positioned in the valve seat recess 52 after the displacement tool 66 has axially displaced the valve seat 28 from the first position of FIG. 9.

Figure 11:
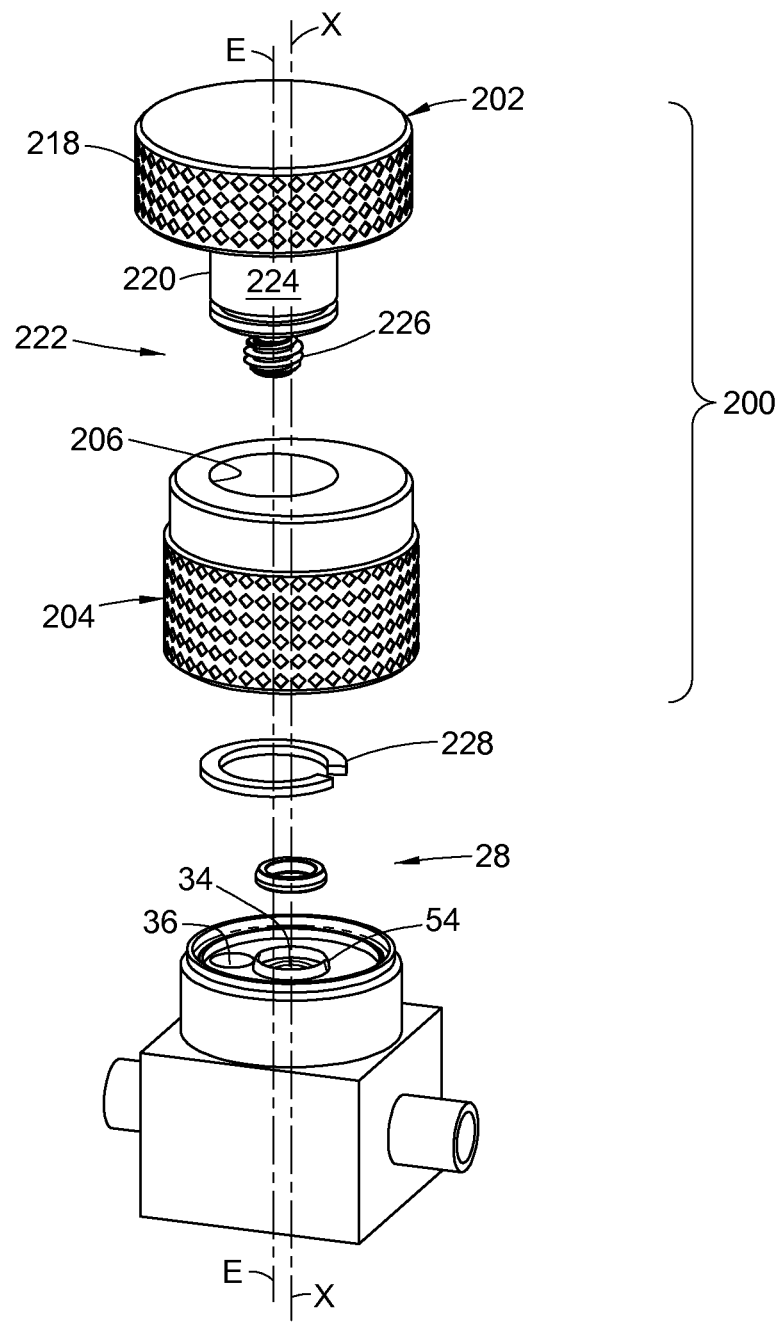
FIG. 11 is an exploded perspective view of an embodiment of a valve seat extraction tool assembly.
Figure 12:
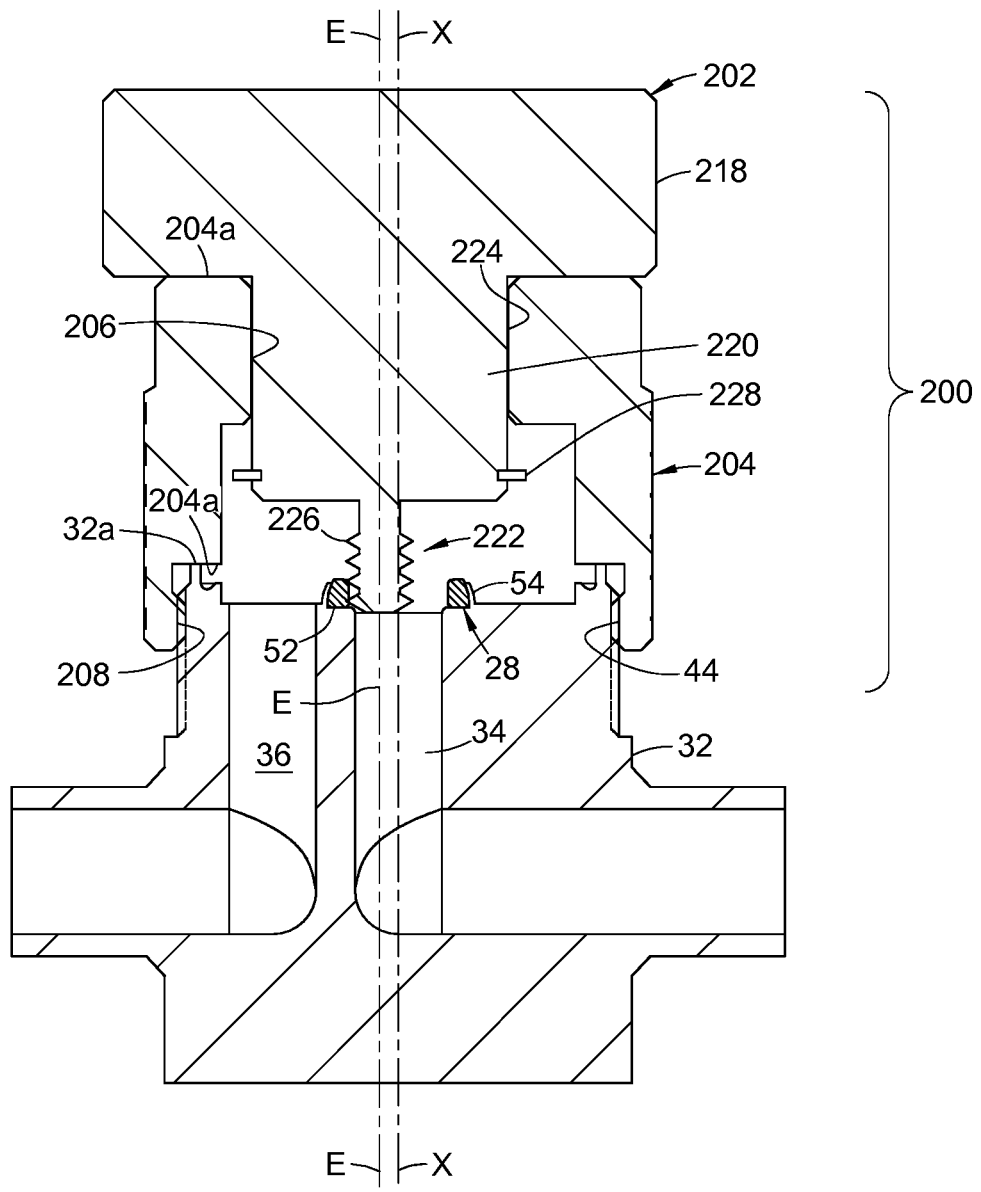
FIG. 12 is a longitudinal cross-section view of the assembly of FIG. 11.
Figure 13:
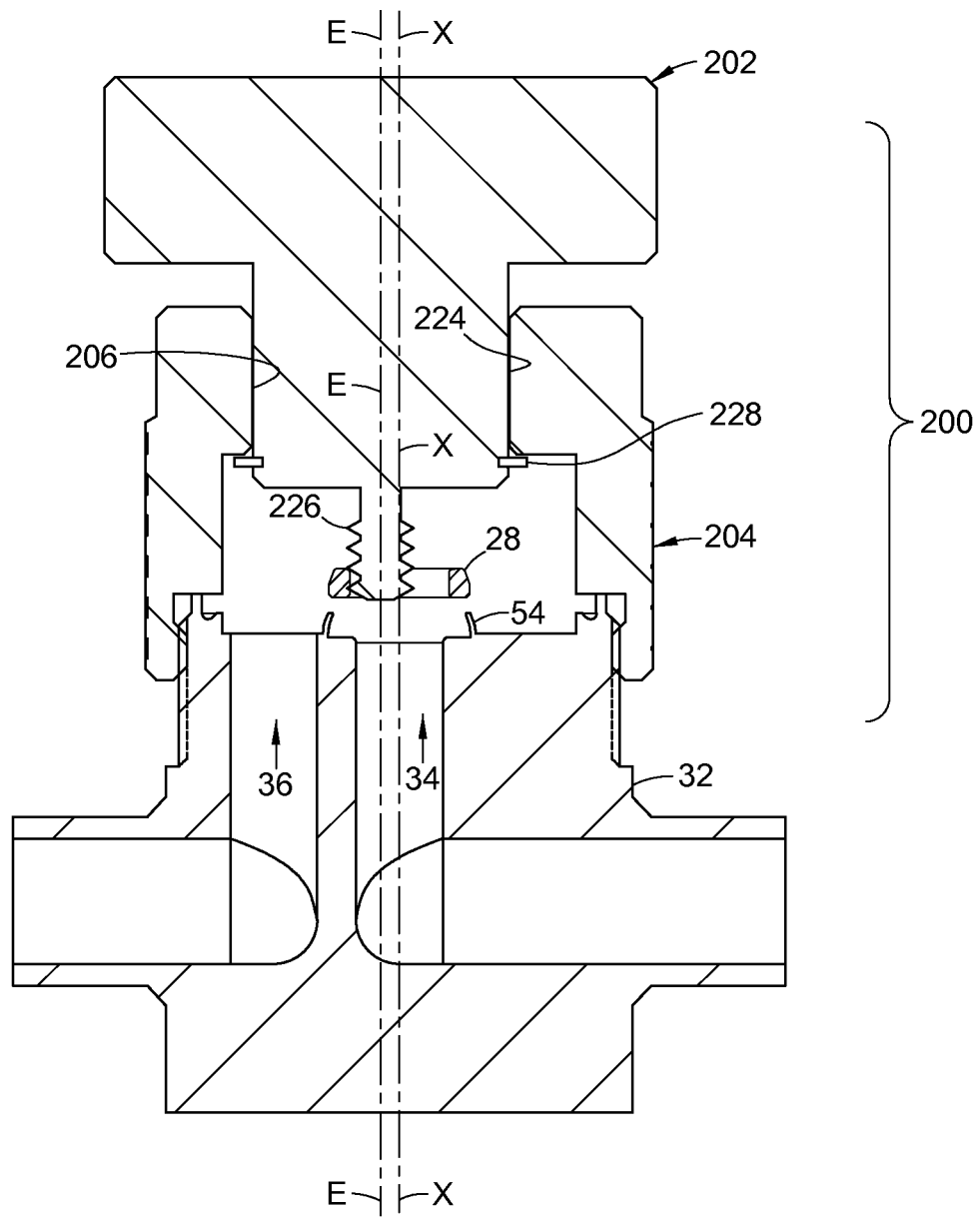
FIG. 13 is a longitudinal cross-section of the valve seat extraction tool with a valve seat extracted.

With reference to FIGS. 11-13, another embodiment of a valve seat extraction tool assembly 200 includes a valve seat extraction tool 202 and an alignment member 204. For this description, like reference numerals are used for like components in the embodiment of FIGS. 6 and 8 herein. The valve seat extraction tool 202 may include a knob 218, a central stem 220 and a central threaded portion 222 which in an embodiment may be a threaded valve seat engaging portion or tip of the stem 220. The valve seat extraction tool 202 may be but need not be the same design as the embodiment of FIGS. 6 and 8 herein. The threaded portion 222 (hereafter we refer to the exemplary embodiment of a threaded tip 222) functions to grip or grab the valve seat 28 so as to be able to be used to extract the valve seat 28 from the valve seat recess 52. The valve seat extraction tool 202 may be aligned with the valve seat 28 using the alignment member 204 or other technique. Unlike the embodiment of FIGS. 6 and 8, the alignment member 204 has an eccentric alignment bore as further described below, and therefore in this embodiment we refer to the alignment member 204 as being an eccentric alignment member 204.

The stem 220 may have a right circular cylinder shaped smooth wall 224 that is closely received and preferably journals in a corresponding right cylinder smooth alignment bore 206 of the alignment member 204. From FIG. 12 note that the alignment member 204 may include an internal threaded portion 208 that allows the alignment member 204 to be threaded onto the mating threaded portion 44 of the valve body 32 (see FIGS. 4 and 5A.)

In an embodiment, the eccentric alignment member 204 may have a central longitudinal axis that is coaxial with the axis X, which also is the centerline of the valve seat 28. However, the alignment bore 206 is preferably eccentrically positioned on a longitudinal axis E. The axis of eccentricity E thus is parallel to but radially offset from the axis X. This results in the threaded tip 222 being aligned with the axis E because the threaded tip 222 is centrally located on the central stem 220. The threads 226 of the threaded tip 222 are preferably sharply tapered. In order to extract the valve seat 28 from the valve seat recess 52 after the actuator assembly 12 and the bonnet nut 42 have been removed, the diaphragm 24 (FIG. 1) is removed to provide access to the valve seat 28. The eccentric alignment member 204 is installed onto the valve body 32 threaded portion 44 and tightened down. The eccentric alignment member 204 may include a counterbore 204a that contacts an upper surface 32a of the valve body 32.

The valve seat extraction tool 202 is slid axially into the eccentric alignment member 204. The eccentric alignment member 204 aligns the threads 226 of the threaded tip 222 with the axis of eccentricity E. Initially, the knob 218 may be axially spaced from a top surface 204a of the eccentric alignment member 204 when the threaded tip 222 initially contacts the valve seat 28. As the sharply threaded tip 222 engages the valve seat 28, the threads 226 of the threaded tip 222 self-tap a threaded connection with the valve seat 28. Due to the eccentric alignment of the threads 226 with the valve seat 28, the threaded portion 222 self-taps into only a portion or arcuate section of the inside diameter surface of the valve seat 28, as illustrated in FIGS. 12 and 13. A small axially downward force may be applied to the knob 218 as the knob 218 is also turned. This will assist in the self-tapping between the threads 226 of the threaded tip 222 and the valve seat 28. The knob 218 may be turned even after the knob 218 makes contact with the upper surface 204a of the eccentric alignment member 204. This eccentric engagement between the threads 226 and the valve seat 28 prevents rotation of the valve seat 28 during the self-tapping, thus eliminating any need for anti-rotation features. Because the threads 226 only engage a portion of the valve seat 28, the threads 226 may be of smaller diameter than the inside diameter of the valve seat 28 which makes it easier to remove the valve seat 28 from the threaded tip 222 after the valve seat has been extracted. Also, by only tapping a portion of the valve seat 28, the valve seat 28 can be extracted more easily from the valve seat recess 52 as one side of the valve seat 28 is lifted initially through the support wall 54. Note that FIG. 13 illustrates the valve seat 28 in a fully extracted position from the valve seat recess 52. After the threads 226 have self-tapped the valve seat 28, the valve seat extraction tool 202 may be pulled axially upward (as viewed in FIG. 13) and out of the eccentric alignment member 204, and then the eccentric alignment member 204 may be loosened and removed from the valve body 32. The eccentrically aligned extraction tool has been found to be especially useful, although not limited to, extraction of valve seats made of harder materials, for example, VESPEL™.

As an alternative embodiment, a retainer 228, for example a C-clip or ring 228, may be positioned in a groove on the stem 220 so as to prevent the valve seat extraction tool 202 from being fully removed from the eccentric alignment member 204. The retainer 228, for example, may have an outer diameter that is greater than the diameter of the bore 206. The knob 218 may be turned so as to have the threads 226 self-tap into the inside diametrical surface of the valve seat 28 to capture the valve seat. Then the valve seat extraction tool 202 is lifted axially so as to extract the valve seat 28 from the valve seat recess 52. However, the retainer 228 will prevent the valve seat extraction tool 202 from being fully separated from the eccentric alignment member 204. The eccentric alignment member 204 may then be loosened or otherwise disconnected from the valve body 32, and the valve seat extraction tool assembly 200 can be withdrawn or separated away from the valve body 32 with the extracted valve seat 28 also removed therewith.

Figure 14:
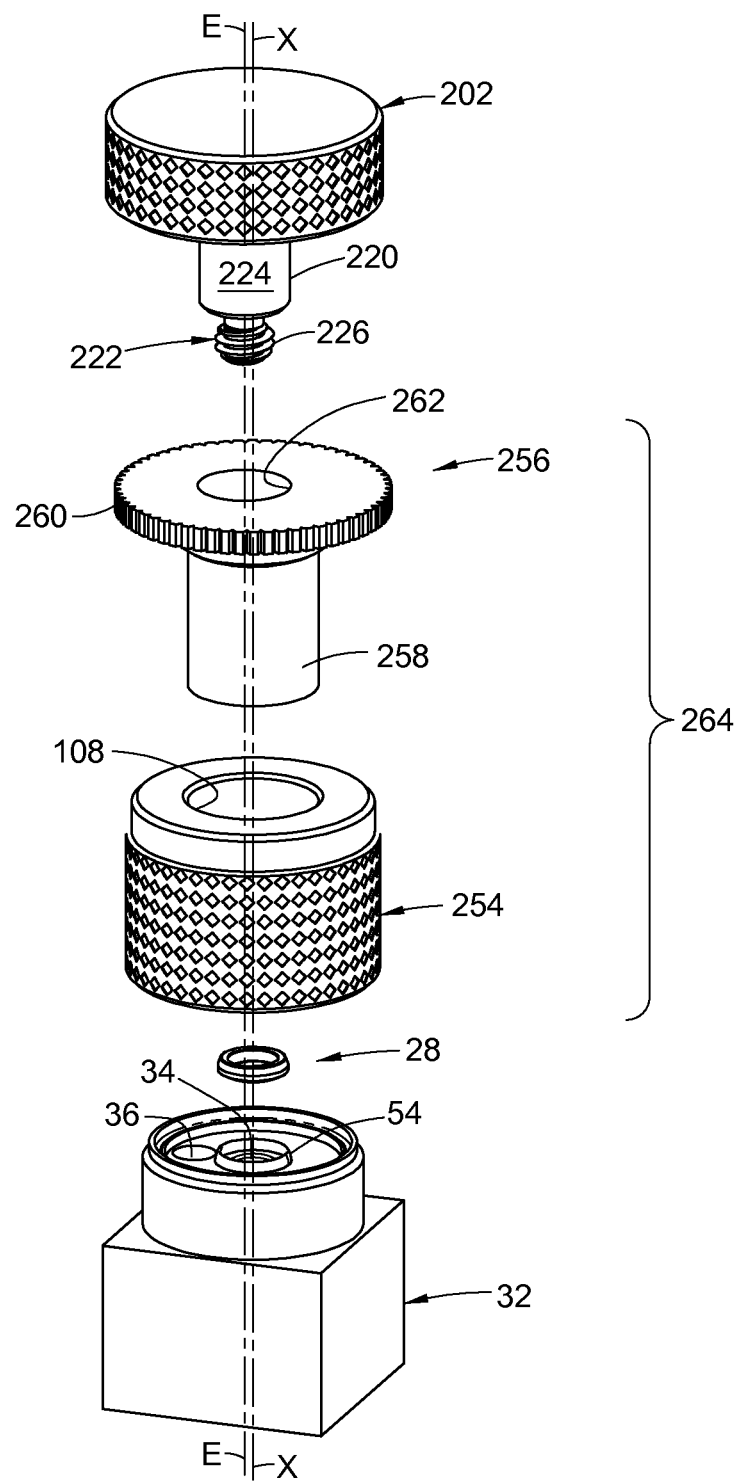
FIG. 14 is an exploded perspective view of another embodiment of a valve seat extraction tool assembly.
Figure 15:
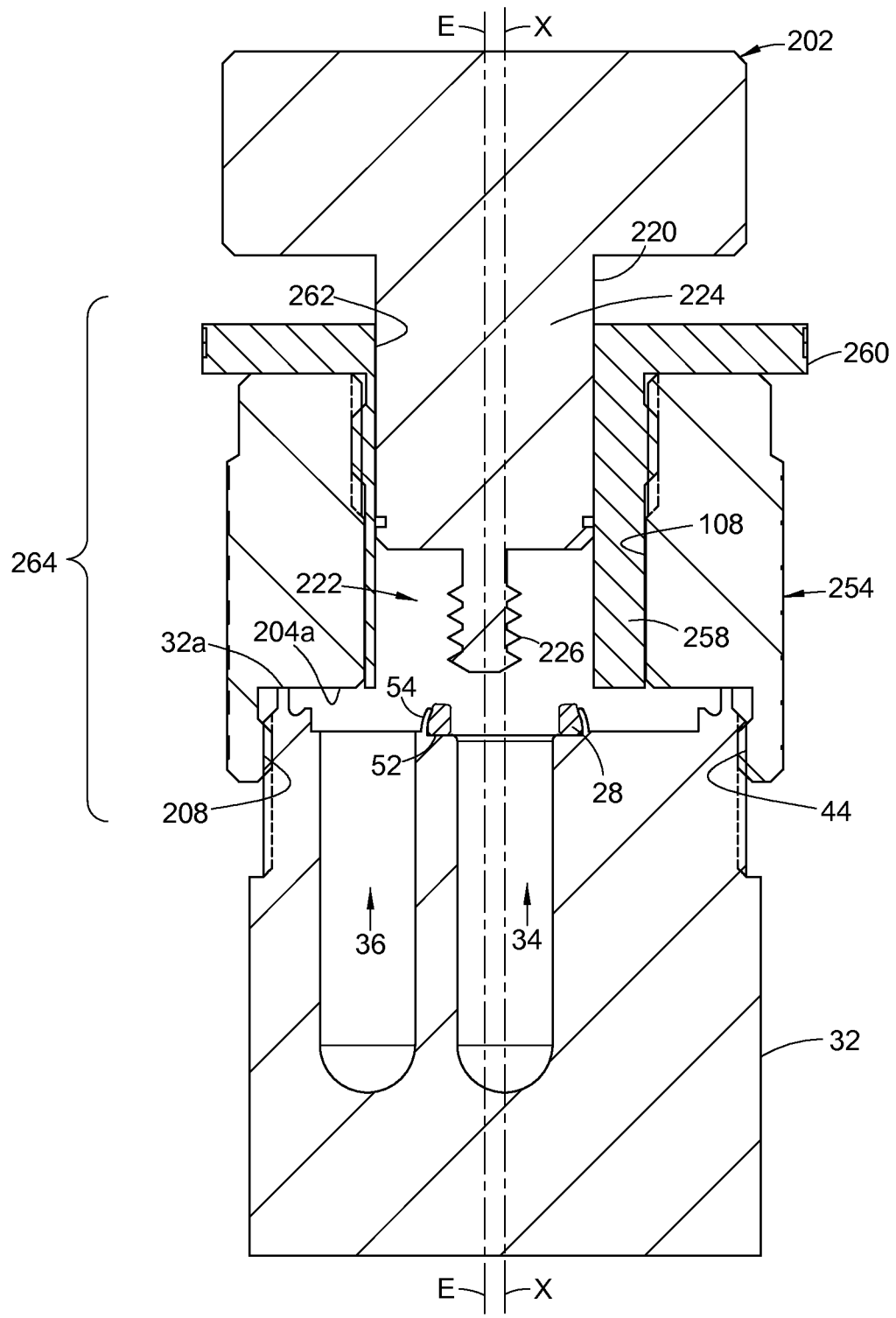
FIG. 15 is a longitudinal cross-section view of the assembly of FIG. 14.
Figure 16:
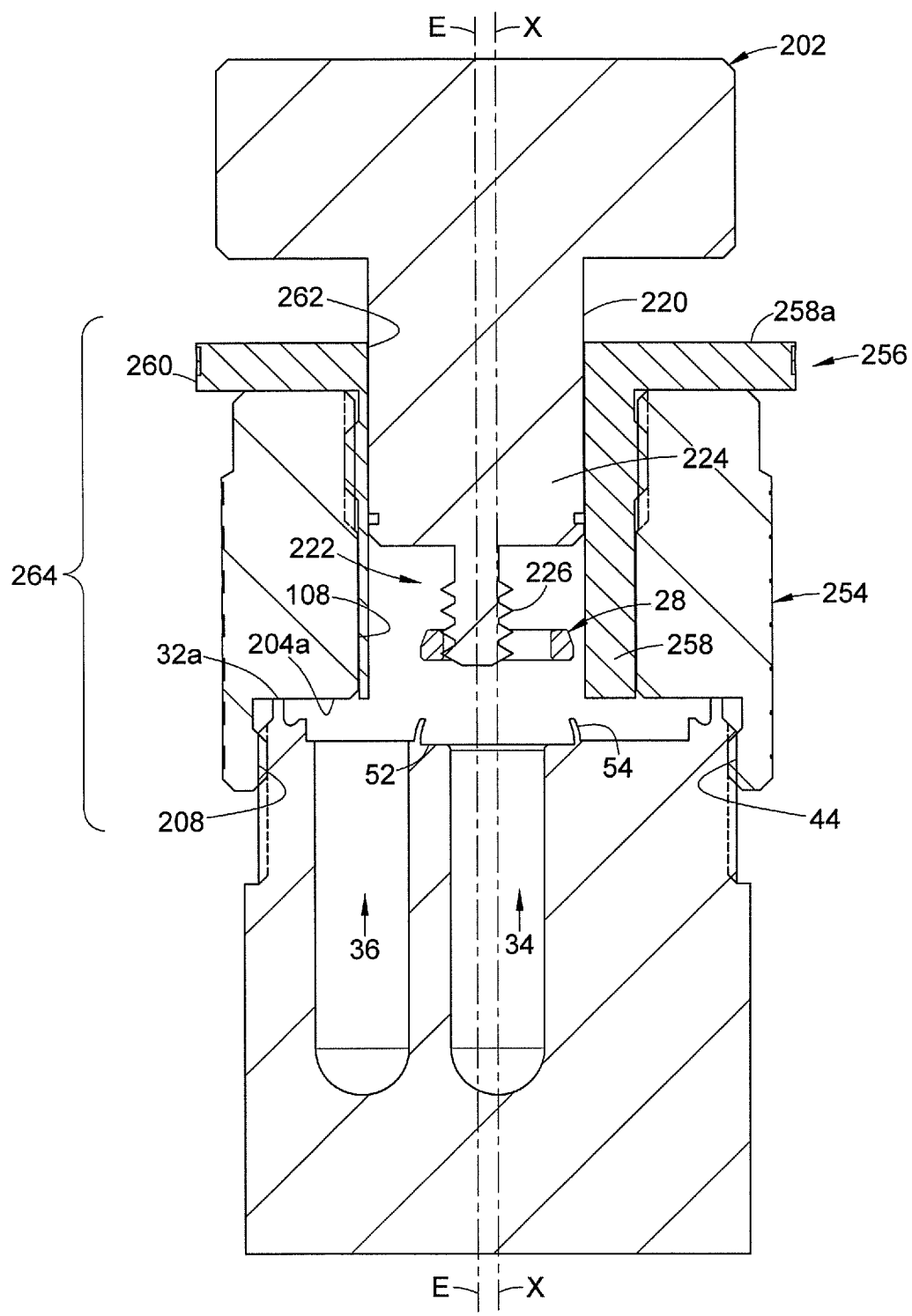
FIG. 16 is a longitudinal cross-section of the valve seat extraction tool with a valve seat extracted.

With reference to FIGS. 14-16, an alternative embodiment is shown. This embodiment may but need not share most of the elements and components as the embodiment of FIGS. 11-13, and like elements and components are given the same reference numeral and the description need not be repeated. Both embodiments may operate the same in terms of the functionality or installation and extraction of a valve seat 28.

In an embodiment, rather than a single piece eccentric alignment member such as the element 204 in FIGS. 11-13, the eccentric alignment of a valve seat extraction tool relative to the valve seat 28 may be introduced in other ways. In FIGS. 14-16, an alignment member 254 is provided and that for convenience may be the same design as the retainer nut 64 used in the embodiment of FIGS. 1-10. Accordingly, the alignment member 254 may include a right cylinder circular bore 108 that has a centerline that is coaxial with the axis X which is the centerline of the valve seat 28. An eccentric insert 256, for example a bushing, has a central right circular cylinder boss 258 that is closely received in the bore 108 of the alignment member 254. An upper flange 260 axially positions the boss 258 within the bore 108. The boss 258 includes an eccentric bore 262 that may be a right cylinder circular bore that extends fully through the boss 258. The longitudinal centerline E of the eccentric bore 262 therefore is the axis of eccentricity and is preferably parallel to but radially offset from the axis X. This results in the threaded tip 222 being aligned with the axis E because the threaded tip 222 is centrally located on the central stem 220. Therefore, the threaded tip 222 will self-tap into a portion of the valve seat 28 as in the embodiment of FIGS. 11-13 and operation of the valve seat extraction tool 202 may operate in the same manner. The alignment member 254 and the eccentric bushing 256 thus form a two piece eccentric alignment member 264. Note from FIG. 15 that the eccentric member flange 260 may seat against an upper surface 254a of the alignment member 254 in order to axially position the boss 258 within the bore 108 of the alignment member 254. An upper surface 258a of the boss 258 may also function as a stop surface for the valve seat extraction tool 202.

In both embodiments of FIGS. 11-16, the diametric size of the threads 226 relative to the inside diameter of the valve seat 28 may be selected so as to engage a desired portion of the valve seat. Although preferably the threads 226 will self-tap into an arcuate portion of the valve seat (see FIGS. 13 and 16 for examples) that is less than the entire inside surface of the valve seat 28, the size of the arcuate portion, or in other words the amount of surface area tapped by the threads 226 is a matter of design choice and is also a function of the wall thickness of the valve seat 28 and the thread depth. It may be that in some cases a small radial offset of the axis E from the axis X may be used so that there may even be contact over most or all of the internal surface of the valve seat 28, but with a bias or greater depth of self-tapping into a portion of the valve seat 28.

The inventions herein are not limited to the exemplary embodiments. The apparatus and methods may be used with different valve designs for example as well as different actuators. The valve seat carrier 62 may have many different geometries and configurations to adapt the seat carrier with a particular valve body 32. The carrier recess 82 also may be configured based on the shape of the valve seat 28 and the robustness needed to retain the valve seat 28 in the seat carrier 62. The valve seat recess 52 also need not be a staked or tapered frusto-conical recess. The valve seat displacement tool 66 may also be realized in many different forms and configurations, as may the valve seat extraction tool 58. Different valve seat extraction techniques may alternatively be used.

It is intended that the inventions not be limited to the particular embodiments disclosed for carrying out the inventions, but that the inventions will include all embodiments falling within the scope of the appended claims.

The invention claimed is:

1. A valve and tool assembly, comprising:
   a valve comprising a longitudinal axis and a valve seat recess,
   a valve seat, and
   a valve seat extraction tool that is attachable to said valve by an eccentric alignment member;
   wherein the eccentric alignment member is adapted to be assembled with the valve to eccentrically align the valve seat extraction tool with the valve seat, wherein said eccentric alignment member has an alignment axis that is parallel to and radially offset from a centerline of the valve seat when the valve seat extraction tool is mounted to the valve body.

2. The valve and tool assembly of claim 1, wherein the valve seat extraction tool comprises a seat engaging tip.

3. The valve and tool assembly of claim 2, wherein the seat engaging tip comprises a threaded portion configured to self-tap a threaded connection with the valve seat when the tool is operated to bring the threaded portion into engagement with the valve seat.

4. The valve and tool assembly of claim 3, wherein the seat engaging tip is attachable with the valve to eccentrically align the threaded portion with the valve seat.

5. The valve and tool assembly of claim 2, wherein the seat engaging tip is attachable with the valve to eccentrically align the seat engaging tip with the valve seat.

6. The valve and tool assembly of claim 1, wherein the alignment member comprises a retainer nut threadably adapted to be threadably mated with the valve body.

7. The valve and tool assembly of claim 6, wherein the retainer nut comprises an internal bore having a central axis that is parallel to and radially offset from a center line of the valve seat, the internal bore receiving the valve seat extraction tool therethrough.

8. The valve and tool assembly of claim 7, wherein the valve seat extraction tool comprises a cylindrical wall that is closely received and vertically slideable in the internal bore.

9. The valve and tool assembly of claim 6, wherein the retainer nut comprises an alignment bore having a central axis that is coaxial with a center line of the valve seat, and an eccentric bushing received in the internal bore, the eccentric bushing comprising an alignment bore having a central axis that is parallel to and radially offset from the center line of the valve seat, the alignment bore receiving the valve seat extraction tool therethrough.

10. The valve and tool assembly of claim 9, wherein the valve seat extraction tool comprises a cylindrical wall that is closely received and vertically slideable in the alignment bore.

11. The valve and tool assembly of claim 1 wherein said alignment member is threadably connectable with said valve.

12. A valve seat extraction tool assembly comprising a valve seat extraction tool having a threaded portion, and an eccentric alignment member that is adapted to be mounted to a valve body to align said threaded portion eccentrically with a valve seat, wherein said eccentric alignment member has an alignment axis that is parallel to and radially offset from a centerline of the valve seat when the valve seat extraction tool is mounted to the valve body.

13. The valve seat extraction tool assembly of claim 12 wherein said eccentric alignment member comprises a retainer nut that is adapted to be threadably mated with the valve body, and an eccentric bushing that is at least partially received in said retainer nut.

14. A valve seat extraction tool assembly comprising a valve seat extraction tool having a threaded portion, and an eccentric alignment member that is adapted to be mounted to a valve body to align said threaded portion eccentrically with a valve seat, wherein said eccentric alignment member comprises a retainer nut threadably adapted to be threadably mated with the valve body, the retainer nut comprises an internal bore having a central axis that is parallel to and radially offset from a center line of the retainer nut.

\* \* \* \* \*